C. J. WILSON.
VENTILATING SYSTEM.
APPLICATION FILED DEC. 9, 1907.
903,935.
Patented Nov. 17, 1908.
2 SHEETS—SHEET 1.
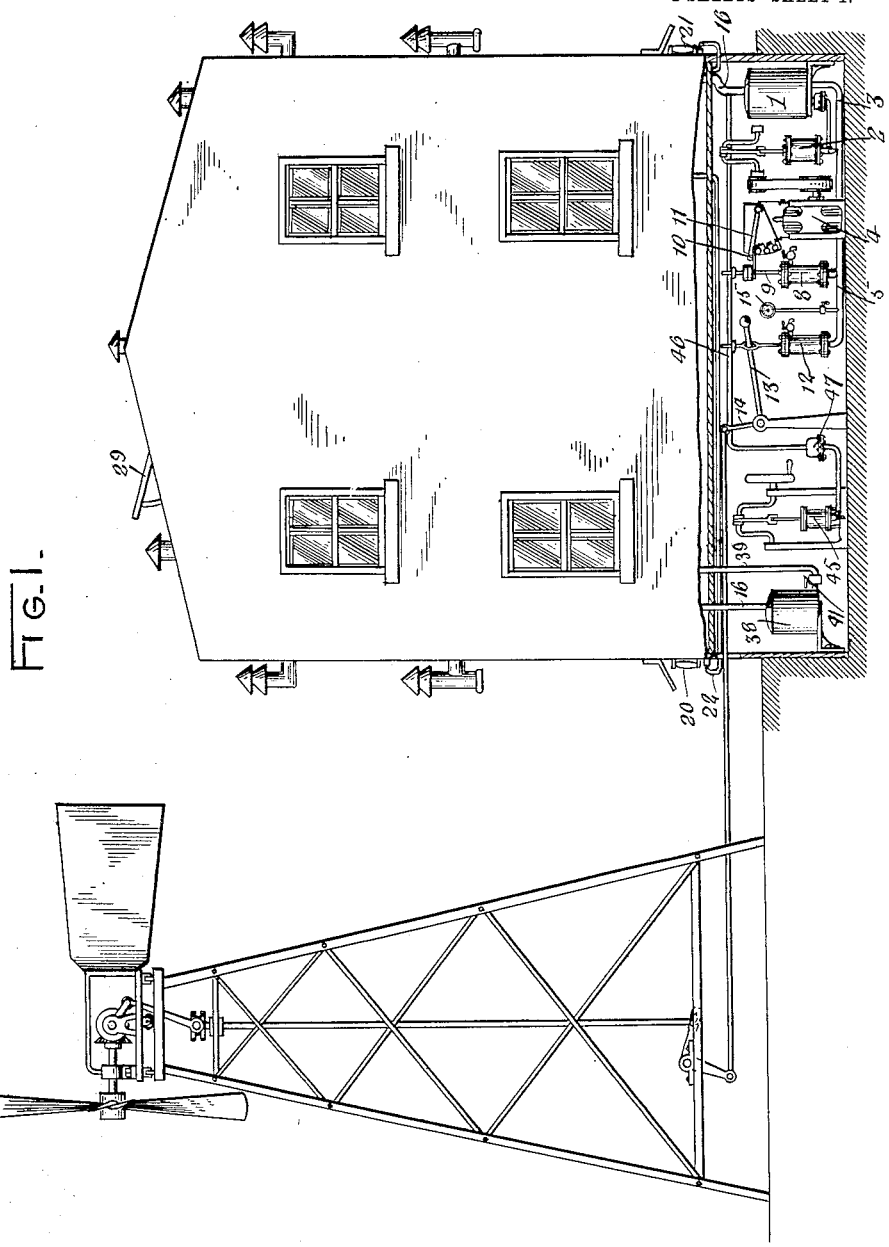
Witnesses:
Eugene M. Sliney
W. S. Babcock
Christopher J. Wilson.
Inventor
By Marion & Marion
Attorneys

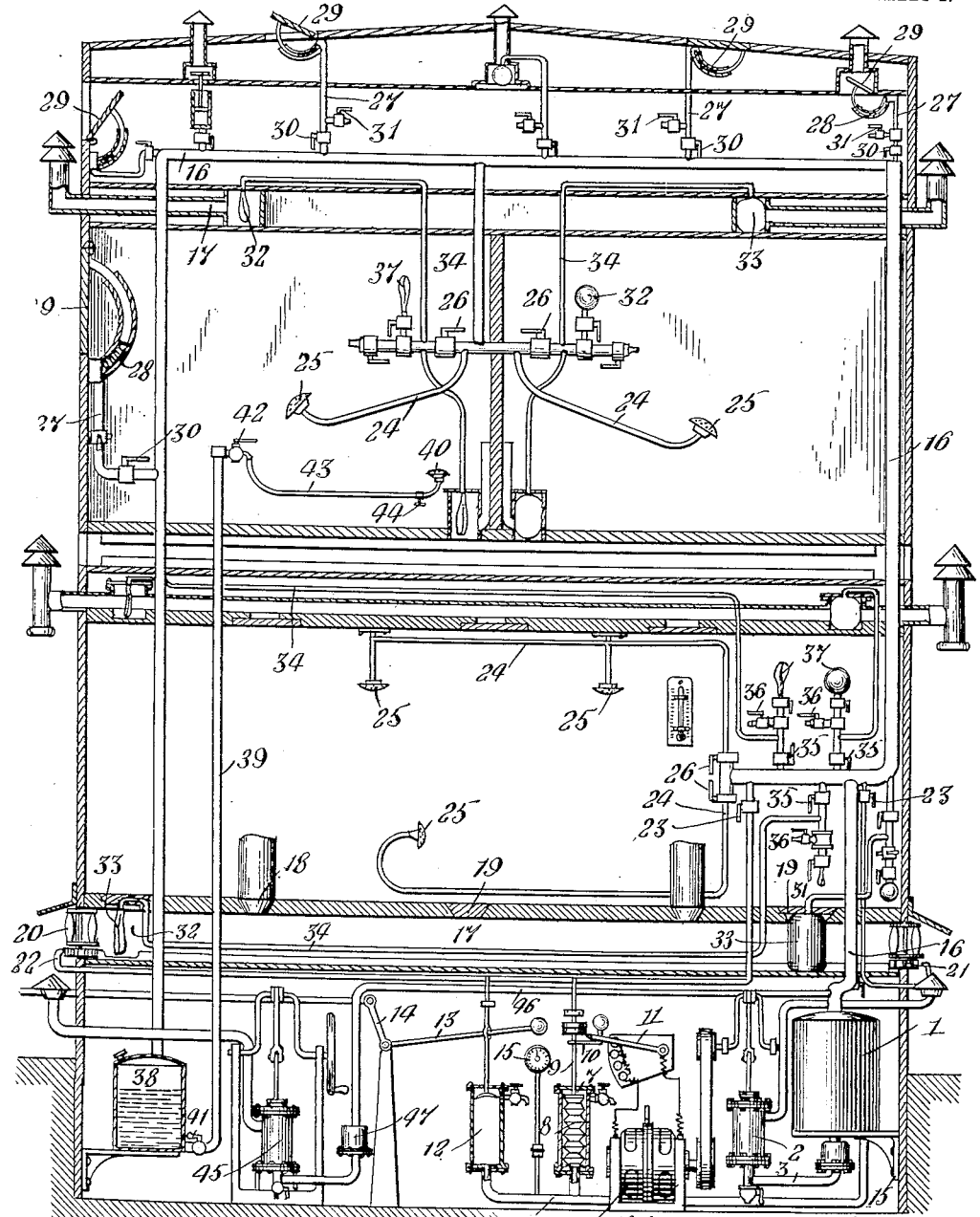

UNITED STATES PATENT OFFICE.

CHRISTOPHER J. WILSON, OF MONTREAL, QUEBEC, CANADA.

VENTILATING SYSTEM.

No. 903,935.　　　　Specification of Letters Patent.　　　Patented Nov. 17, 1908.

Application filed December 9, 1907. Serial No. 405,757.

*To all whom it may concern:*

Be it known that I, CHRISTOPHER J. WILSON, a subject of the King of Great Britain, residing at the city and district of Montreal, in the Province of Quebec, Canada, have invented certain new and useful Improvements in Ventilating Systems; and I do hereby declare that the following is a full, clear, and exact description of the invention, such as will enable others skilled in the art to which it appertains to make and use the same.

The present invention relates to a sanitary system for ventilating buildings, or groups of buildings, by the aid of compressed air, and means for compressing the air.

It is particularly adapted for use in large public buildings, such as theaters, public halls, hospitals and the like. It may be used with great advantage for ventilating a large number of buildings in a town, and may be installed and operated in the same general way as a lighting system, having mains and branch pipes leading from a central station to the various buildings in which it is to be used.

Broadly speaking, it comprises a storage tank for compressed air, means for compressing air into the storage tank, a system of mains leading from the storage tank, branch pipes leading from the mains and adapted to deliver air under pressure to rooms, compartments or buildings, cocks for controlling these branch pipes, separate branch pipes leading from the mains to points adjacent the closures of the room or buildings in which these branch pipes are placed, the branch pipes being provided with means operated by the compressed air for actuating the closures, cocks for controlling the second branch pipes, a third set of branch pipes leading from the mains and provided with roses or spray nozzles through which the air may be sprayed throughout the room, cocks controlling this third set of branch pipes, a fourth set of branch pipes leading from the main and provided with jet nozzles, ventilating fans adapted to be driven by the air from these jet nozzles, conduits adapted to receive the currents of air generated by the fans and provided with delivery openings, cocks for controlling the fourth set of branch pipes, a disinfectant tank connected to the main, a branch main leading from the disinfectant tank, roses connected to the branch main and adapted to deliver disinfectant in the form of spray, valves for controlling the flow of disinfectant, means for closing the conduits which receive air currents from the fans, and means for indicating the presence or absence of air pressure in any one or more of the several branch pipes or groups of branch pipes.

In order to enable one skilled in the art to which the invention relates to more readily understand the construction, operation and use of the same, reference should be had to the accompanying drawings, forming part of the present application.

Throughout the several views, like reference characters designate the same parts.

In the drawings: Figure 1 is a side elevation of the house, the lower part being shown in section to illustrate the installation of the system and the connections with a windmill for compressing air for use in the system; and, Fig. 2 is a section of the house on an enlarged scale, showing the system in detail.

A suitable storage tank or container 1 is adapted to receive air from a pump or compressor 2 through a pipe 3, a check valve of well known form being interposed in the pipe or in the base of the container to allow the air to be forced into the tank, but to prevent its backward flow from the tank to the compressor. The compressor is adapted to be driven from a suitable electric motor 4, through a well known form of belt and pulley connection. A second pipe 5 is connected directly to the tank, and the pressure throughout this pipe is, consequently, the same as the air pressure in the tank. To this pipe is secured a casing 7, which contains an expansible cylinder or tube 8, carrying on its upper end a weighted rod 9, to which is attached one end of an arm 10 adapted to strike and move the switch 11 of the electric motor 4 which operates the pump. Thus whenever the pressure in the tank rises a certain predetermined point, it will overcome the weight on the rod 9, and by raising the rod, through the expansion of the member 8, the switch 11 of the motor will be operated, throwing the motor out of circuit and stopping the compressor.

In order to make use of the natural elements, the compressor may be driven by a wind mill or a water wheel through coupling devices. It is desirable, however, when using a wind mill or a water wheel, and more particularly when using a wind mill, to use the mill or wheel in conjunction with an electric motor, the connections being such that the mill or wheel will do as much of the compression as possible, the motor being put into operation only when necessary.

The arrangement illustrated shows a motor and a wind mill coupled together. In such an arrangement, two compressors, 2 and 12, are used, the compressor 12 being operated by a bell crank lever 13, the arm 14 of which is, in turn, through suitable connections, driven from a wind mill, as shown. Thus, as soon as the wind mill is driven, the compressor 12 will force air into the tank 1 through the pipe 5. During part of the operation of the wind mill, the electric motor 4 will also be in operation, driving the compressor 2. However, as soon as the pressure in the tank 1 rises above a certain point, as previously explained, the motor will be cut out of its circuit, leaving the wind mill to keep up the compression through the compressor 12. Should the wind mill stop or fail to keep the pressure at the required point, the weighted rod 9 will fall, carrying with it the switch 11, and starting the motor.

If desired, a suitable pressure gage 15 may be connected to the pipe 5. Leading from the tank 1 is a main 16, which extends around two sides and across the top of the building. Between the several floors of the building, or in the walls of the same, are tubes or conduits 17, provided with openings 18, which may be closed by removable blocks 19, if desired. The blocks are adapted to be removed in order to allow of insertion of tubes to communicate with the conduits, or to allow the air in the conduits to flow directly into the room or building. When the blocks are in place, they are flush with the floor, and present a perfectly smooth surface. In order to create a draft or current of air through the conduit, fans 20 are placed at one or both ends of the conduit, or at points intermediate of the ends. These fans are connected to paddle wheels 21, which are driven by jets of compressed air directed against them from the nozzles 22, which are connected to the main 16, a cock 23 being placed in the pipe of each nozzle, so that the jet may be turned on or off as desired. These nozzles may be fixed securely in a position to direct the jet against the paddle wheels 21, or they may be held in the proper position by hand, and the jet directed against the wheels. A second set of branch pipes 24 is coupled to the main 16, and provided with roses or sprays 25, either fixed or movable as shown. If movable, they are carried by hose or similar flexible pipes. These pipes 24 are provided with cocks 26, by which the air pressure of the main 16 may be turned on or cut off at will.

A third set of branch pipes 27 is connected to the main 16, and over the end of each of these pipes of the third set is secured one end of an expansible tube 28, the opposite end of which is secured to a movable vent closure 29, such as a window, hatchway, door, ventilator, or the like. Each of these pipes 27 is provided with two cocks 30 and 31. When the cock 30 is opened and the cock 31 closed, air will pass into the pipes 27 under pressure, and the tubes 28 will be expanded, operating the closures to close the vents. When the cock 30 is closed and the cock 31 opened, the tubes 28 will be contracted by the exhaust of the air from the pipes 27, and the closures will be operated to open the vents.

When it is desired to use only one fan at one end of one of the conduits for creating a draft, it is advisable to close the opposite end of the conduits. To this end, the conduits are provided with pockets 32 near their opposite ends, which are adapted to receive the ends of inflatable bags 33, which extend across and completely block the conduits when inflated. Connected to these bags is a fourth set of pipes 34, which are led from the main 16, carrying the pressure from the tank 1. These pipes 34 are provided with two cocks 35 and 36, for inflation and deflation of the bags 33, respectively. When the cocks 35 are opened, and the cocks 36 closed, the bags will be inflated. When the cocks 35 are closed and the cocks 36 are opened, the bags will be deflated. In order to indicate the condition of the bags, whether inflated or deflated, rubber or other expansible bulbs 37 are secured over the open ends of short arms leading from the pipes 34, and at a point beyond the cocks 36. Thus, when the cocks 35 and 36 are set to inflate the bags 33, the bulbs 37 will also be inflated, and they will remain inflated until the cocks 35 and 36 are set to deflate the bags 33, when they will also be deflated, thus indicating invariably the exact condition of the bags 33. The various valves of the branch pipes may be so arranged and placed, of course, as to render one room, compartment, building, or group of buildings, absolutely independent of its fellows, connected to the same system, much the same as in well known heating or lighting systems now in use.

With this ventilating system is also combined a disinfecting system. This comprises a disinfectant tank 38, which is coupled to the end of the air pressure main 16 in such manner as to allow the air to enter the tank above the liquid, which is consequently under high pressure. From the bottom of this tank is led a branch main 39, through which the disinfectant may be forced to the roses or sprays 40, in various compartments, wherever the system is used. Only one of these nozzles is shown to illustrate its use and application and its connection with the system. The branch main is, preferably, provided with a cock 41, near the base of the tank, to be closed when the tank is being filled, and other cocks 42 for the connection of each tube or hose 43, carrying a rose 40. It is also convenient to provide each of these hose 43 with an additional valve 44 adjacent the rose, so that as the rose is moved about to spray various parts of a room, the supply of disinfectant may be cut off at any moment without having to return to the cock 42.

In case of simultaneous breakage of the motor 4 and failure of the wind mill, a hand pump 45 has been provided, which communicates through the pipe 46 with the top of the tank 1, the pipe 46 being provided with a check valve 47 to prevent return of air forced therethrough.

Many changes in the construction and arrangement of the several parts, many other connections of the branch pipes with the main and branch main, many other arrangements of the several compressors and the means for operating the same, various other combinations for driving the compressors; other forms of disinfecting apparatus, various other means for operating the vent closures from a set of branch pipes connected with the main, and other means for indicating the condition of the inflatable bags controlling the conduits may be used, and many other uses and applications of the system as a whole and of the various combinations of the several parts of the system may be had, without in any way departing from the real intent of the present invention, and it is meant to include all such within this application, wherein only one preferred form of the system and its several parts has been shown in order to illustrate the construction and application of the invention.

Having thus fully described my invention, what I claim as new, and desire to secure by Letters Patent, is:—

1. In a sanitary ventilating system, an air tank, a compressor for forcing air into the tank under pressure, means for operating said compressor, a main leading from said tank, conduits, means adapted to generate currents of air through said conduits, branch pipes leading from the aforesaid main, inflatable bags attached to said branch pipes and adapted to be placed within said conduits to act as valves to close or open the conduits, and means for controlling the admission of air to said branch pipes to inflate said bags and close said conduits.

2. In a sanitary ventilating system, a tank, means for compressing air into said tank, a main leading from said tank, conduits, means for generating currents of air through said conduits, openings in said conduit for the passage of air to desired points, inflatable bags adapted to be placed in the conduits to act as valves for opening or closing the same, branch pipes leading from the aforesaid main to said inflatable bags, means interposed between the branch pipes and the main for admitting air to said inflatable bags, and means for exhausting air from said inflatable bags.

3. In a sanitary ventilating system, a tank, means for compressing air into said tank, a main leading from said tank, conduits, means for generating currents of air through said conduits, openings in said conduit for the passage of air to desired points, inflatable bags adapted to be placed in the conduits to act as valves for opening or closing the same, branch pipes leading from the aforesaid main to said inflatable bags, means interposed between the branch pipes and the main for admitting air to said inflatable bags, means for exhausting air from said inflatable bags, and means for indicating the condition of the inflatable bag.

4. In a sanitary ventilating system, an air tank adapted to contain compressed air, means for compressing air into said tank, a main leading from said tank, conduits, fans for generating currents of air in said conduits, branch pipes leading from said main and adapted to deliver jets of air to drive said fans, and means for controlling the admission of air to said branch pipes from the aforesaid main.

In witness whereof I have hereunto set my hand in the presence of two witnesses.

CHRISTOPHER J. WILSON.

Witnesses:
E. M. SLINEY,
W. S. BABCOCK.